United States Patent

[11] 3,607,184

[72] Inventor George F. Williams
Toledo, Ohio
[21] Appl. No. 720,855
[22] Filed Apr. 12, 1968
[45] Patented Sept. 21, 1971
[73] Assignee Owens-Illinois, Inc.

[54] METHOD AND APPARATUS FOR DRAWING A DEVITRIFIABLE GLASS AT A TEMPERATURE BELOW THE LIQUIDUS TEMPERATURE
7 Claims, 2 Drawing Figs.

[52] U.S. Cl. ................................................. 65/83,
65/33, 65/86, 65/132, 65/187, 65/327, 106/52
[51] Int. Cl. ................................................. C03b 9/38
[50] Field of Search ........................................... 65/126,
127, 128, 129, 130, 131, 132, 327, 329, 33, 86, 83,
183, 187; 106/52

[56] References Cited
UNITED STATES PATENTS
1,565,319 12/1925 Fowle .......................... 65/327

| | | | |
|---|---|---|---|
| 2,951,316 | 9/1960 | Slayter ....................... | 65/126 |
| 3,160,492 | 12/1964 | Chapman .................... | 65/128 |
| 3,303,011 | 2/1967 | Fukuzaki ..................... | 65/126 |
| 3,365,314 | 1/1968 | Sack ........................... | 106/52 |
| 3,244,495 | 4/1966 | Apple et al. ................. | 65/161 |

Primary Examiner—S. Leon Bashore
Assistant Examiner—J. B. Hardaway
Attorneys—W. A. Schaich and Thomas A. Meehan ABSTRACT: This application discloses method and apparatus for producing, without appreciable surface devitrification, glass tubing from a glass composition which has a liquidus temperature close to the temperature at which the glass is at its preferred working viscosity. According to the invention, glass is delivered in a thin stream from a feeder of a glass-melting furnace to a relatively small receiving vessel and is rapidly and evenly cooled to a temperature below the liquidus temperature en route. The glass is maintained in the receiving vessel in a body without reheating above the liquidus temperature and a glass product of predetermined shape is downwardly drawn from the body of glass in an otherwise conventional fashion.

PATENTED SEP 21 1971

3,607,184

INVENTOR.
GEORGE F. WILLIAMS
BY W.A. Schaich &
Thomas A. Meehan
ATTORNEYS

METHOD AND APPARATUS FOR DRAWING A DEVITRIFIABLE GLASS AT A TEMPERATURE BELOW THE LIQUIDUS TEMPERATURE

BRIEF SUMMARY OF THE INVENTION

This invention relates to the drawing of glass in various forms, e.g., tubing, rod or sheet, from glass compositions of a type wherein the liquidus temperature of the glass occurs at or very close to the temperature which the glass has at the preferred working viscosity of the glass. As a consequence of such a relationship between the liquidus temperature and the glass temperature at working viscosity, such glasses are, as is well understood, subject to undesirable devitrification, especially on the surface which contacts the forming member, e.g., in the case of glass tubing, the inside surface of tubing produced in the Danner process or either surface of tubing produced in the downdraw process. The glass which contacts such forming member, because of its frictional engagement therewith, flows considerably slower than the other portions of the glass stream. Since the rate of devitrification at or near the liquidus temperature of a given glass is a function of time, as is explained at page 42 of the "Handbook of Glass Manufacture," compiled by Fay V. Tooley (Ogden Publishing Company, second printing, 1957), the surface of the drawn glass shape which contacts the forming member may be subject to an appreciable degree of devitrification in conventional drawing or forming processes, where the glass shape is customarily drawn directly from a forehearth of the melting vessel.

According to the present invention, however, glass compositions of the foregoing characteristics may be formed into tube, rod, sheet or the like without an intolerable degree of devitrification by providing a receiving vessel of limited capacity to receive molten glass from a forehearth of the glass melting furnace, by flowing glass from a forehearth of the melting furnace into such receiving vessel in a thin stream, by cooling such thin stream to a temperature sufficiently low to avoid appreciable devitrification, by maintaining the molten glass in the receiving vessel without reheating to a temperature where the glass tends to devitrify at an appreciable rate, and by drawing glass downwardly from the receiving vessel in the desired form, e.g., tube, rod, or sheet, in a manner which may be the same as that employed in other known downdraw systems. The use of an intermediate receiving vessel in the manner as above-described makes it possible to control the glass-drawing temperature within much narrower limits than has been heretofore possible so as to make it practical to draw glass at a suitable drawing temperature which may be accurately maintained at a safe predetermined differential from the liquidus temperature of the glass.

Accordingly, the objects of the present invention are to provide method and apparatus for drawing, without significant devitrification, glass shapes of indefinite length from a glass composition which has a liquidus temperature close to the temperature of the glass at its preferred working viscosity.

For a further understanding of the present invention an the objects thereof, attention is directed to the following portion of the specification, the drawing and the appended claims.

DETAILED DESCRIPTION OF THE INVENTION

Figure 1:
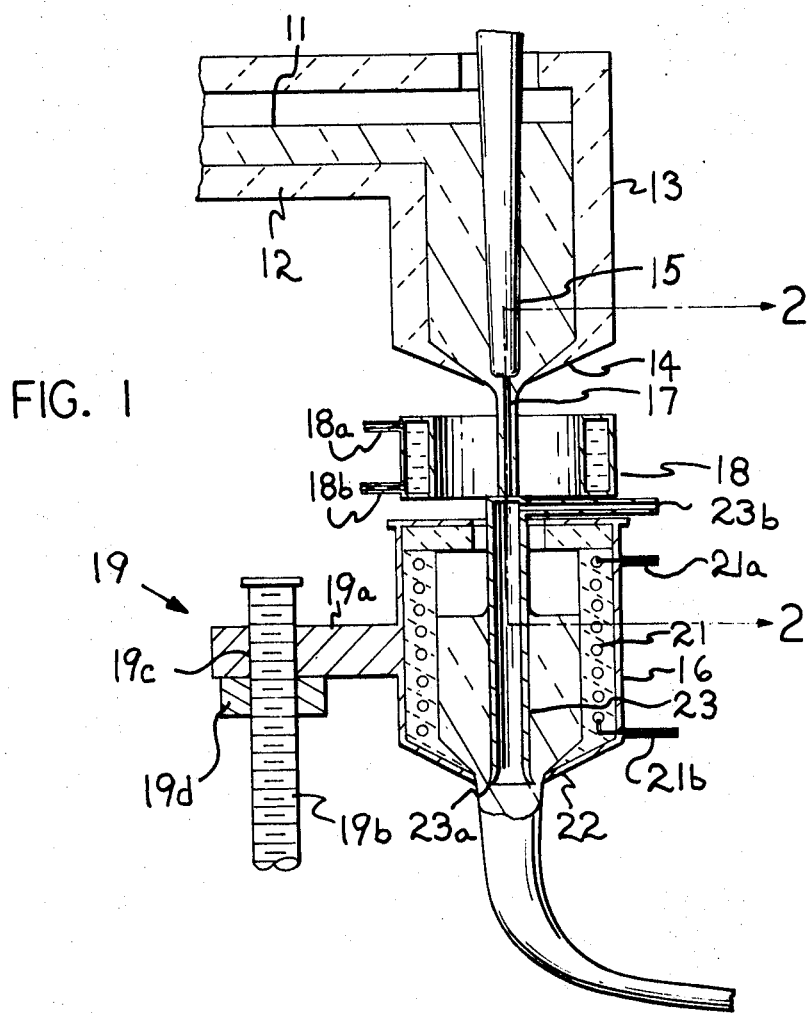
FIG. 1 is a fragmentary elevational view, in section, of apparatus according to the present invention for drawing glass tubing of indefinite length by the method of the present invention.

Many glass compositions have long been known to $SiO_2$—61.5%; properties which would be advantageous in drawn products, e.g., tubing, rod, sheet and the like, produced therefrom. However, it has not heretofore been practical to commercially produce such drawn products from such glass compositions in known drawing systems due to the tendency of such glasses to devitrify as a consequence of having a liquidus temperature very close to the temperature of the glass at its desired drawing viscosity. An example of such a glass is an alkali-free aluminosilicate glass composition produced by Owens-Illinois, Inc., the assignee of this application, under the designation EE-2. This glass has approximately the following composition, on a weight basis: $SiO_2$—61.5%; $Al_2O_3$—18.7%; $CaO$—11.4%; and $MgO$—8.2%. This glass has a liquidus temperature of approximately 1235° C. and it has a viscosity, at the liquidus temperature, of 3.8 on the logarithmic scale. According to the present invention, glass tubing, in the illustrated embodiment of the invention, may be produced on a substantially continuous basis, without appreciable devitrification of either surface thereof, from such a glass composition, or from any other desirable glass composition which has a similar viscosity at its liquidus temperature.

As is shown in the drawing, a glass 11 of the above-described class is melted in a glass melting furnace which may be of a known configuration, according to the of the user, and which has a forehearth 12 projecting therefrom. Forehearth 12 terminates in a relatively small vessellike feed 13 which extends downwardly from the forehearth and which is in communication therewith. Feeder 13 terminates at its lowermost portion in an outlet orifice 14 and the rate of flow of molten glass 11 through orifice 14 may be accurately regulated by adjusting the vertical position of a tapered vertically adjustable valve member 15, which has a vertical axis positioned centrally of orifice 14.

Located at some appreciable distance beneath feeder vessel 13 is a receiving vessel 16 which receives a stream of molten glass flowing from the outlet orifice 14 of feeder 13. A thin wirelike member 17 is provided extending downwardly from the tip of valve member 15 to a point beneath the level of molten glass in receiving vessel 16 to guide molten glass from feeder 13 to receiving vessel in a smooth stream. The glass stream flowing from feeder 13 to receiving vessel 16 is rapidly and evenly cooled to a temperature below the liquidus temperature by providing a cooling ring 18 circumscribing a portion of its path of travel to receiving vessel 16. Cooling ring 18, as shown, may be of hollow construction for circulation of a cooling fluid therethrough, as is indicated by the provision of inlet and outlet connections 18a and 18b, respectively, in which case cooling of the glass stream flowing to receiving vessel 16 is effected largely by radiation heat transfer to the cooled exposed surface of ring 18.

In some cases it may be desirable to provide for adjustment of the degree of cooling of the glass stream flowing from feeder vessel 13 to receiving vessel 16, as in the case where the rate and/or size of tubing draw from vessel 16 is to be changed thereby necessitating a change in the rate of delivery of glass to vessel 16. In accordance with the present invention, such cooling rate variation may be accomplished by providing means to adjust, within predetermined limits, the vertical spacing between feeder vessel 13 and the combination of cooling ring 18 and receiving vessel 16, which are preferably maintained in fixed orientation relative to one another.

Vertical adjustment of receiving vessel 16, which exposes a greater or lesser length of the molten glass stream above cooling ring to the cooler ambient surroundings, may be effected by providing a plurality of adjustment assembly devices 19, for example, three of such assembly devices spaced at 120° arcuate intervals (only one such assembly device being illustrated in the drawing). Each such device comprises an arm 19a extending outwardly from receiving vessel 16, a threaded rod 19b which is rigidly positioned by means (not shown) and which is received by an unthreaded aperture 19c in arm 19A, and an internally threaded nut 19d which, by the clockwise and counterclockwise nuts thereof, is effective to move arm 19a upwardly and downwardly on rod 19b. In the simplest version, the turning of nut 19d of each assembly device 19 is effected manually. However, it is, of course, obvious that the turning of these nuts may be automatically and simultaneously effected by power operated means (not shown) which, in a most highly refined version, could be actuated by a signal from a closed loop temperature control system.

The body of molten glass contained in receiving vessel 16 may be maintained therein without appreciable cooling by providing heating means to compensate for the normal heat loss therefrom. Such heating means may, for example, comprise an electric resistance element 21 embedded in the refractory lining of vessel 16. Element 21 has leads 21a and 21b extending from the termini thereof, outwardly through the wall of vessel 16 for connection to a suitable power source (not shown).

Molten glass, at a temperature regulated within closely controllable limits to avoid devitrification, passes from an outlet orifice 22 disposed at a lowermost portion of receiving vessel 16. In the illustrated embodiment of the invention, which relates to the substantially continuous forming of hollow tubing, viz, tubing of indefinite or indeterminate length, orifice 22 is of circular configuration and receiving vessel 16 is also provided with a hollow, vertically extending mandrel 23 which terminates centrally of orifice 22 in a flared outlet 23a. Mandrel 23 is also provided with a fluid inlet connection 23b extending outwardly beyond the root of receiving vessel 16 to provide for the continuous introduction of air or other fluid into the bore of the glass tubing which passes from receiving vessel 16 in the annulus between orifice 22 and mandrel 23. The tubing which passes from receiving vessel 16 assumes the configuration of a catenary, as it passes to other equipment (not shown) as is conventionally used in the downdraw (Vello) process of producing glass tubing.

Figure 2:
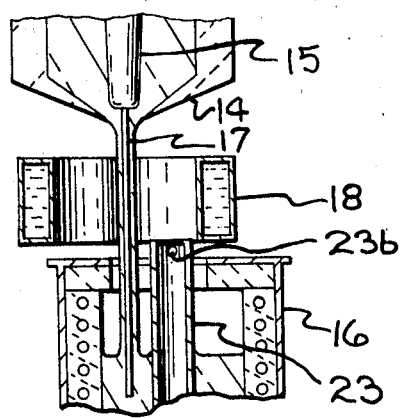
FIG. 2 is a sectional view taken on line 2—2 of FIG. 1.

As is shown in FIG. 2, the vertical axes of feeder vessel 13 and receiving vessel 16 are somewhat offset to provide for the passage of members 17 and 23 through the roof of vessel 16.

The best mode known practicing me to carry out this invention has been described above in terms sufficiently full, clear, concise and exact as to enable any person skilled in the art to make and use the same. It is to be understood, however, that it is within my contemplation that certain modifications of the above-described mode of practicin the invention can be made by a skilled artisan without departing from the scope of the invention and it is, therefore, desire d to limit the invention only in accordance with the appended claims.

I Claim:

1. Apparatus for producing a glass product of indeterminate length and of a desired cross-sectional shape, comprising, in combination: a glass-melting furnace having an outlet for causing a stream of molten glass to flow therefrom through said outlet; a receiving vessel positioned beneath said outlet for receiving said stream of molten glass and for holding a quantity of such glass, said receiving vessel having an orifice at a low elevation thereof, said orifice being contoured to provide the definition of the outer surface of the glass product; means positioned between said furnace and said vessel for cooling the stream of molten glass as it flows from the outlet of the glass-melting furnace to the receiving vessel; a vertically positionally adjustable rodlike valve member comprising an element of the glass-melting furnace, said member being axially aligned with the outlet thereof, having a tip portion located proximate to said outlet, and serving to control the rate of glass flow through said outlet by adjustment of the vertical position of said tip; and a thin wirelike member extending from the tip of the rodlike member downwardly into the receiving vessel for guiding the stream of molten glass thereinto.

2. Apparatus according to claim 1 and further comprising: means for adding heat to the molten glass held in the receiving vessel to compensate for the normal loss of heat therefrom.

3. Apparatus according to claim 1 and further comprising means for effecting adjustment in the vertical spacing between the outlet of the melting furnace and the receiving vessel for adjusting the degree of cooling of the stream of molten glass flowing from said outlet to said receiving vessel.

4. Apparatus according to claim 1 in which the glass product is tubular and in which the receiving vessel comprises: a hollow mandrel terminating centrally of the orifice, said mandrel having an outlet portion contoured to provide the definition of the inner surface of the tubular glass product.

5. Apparatus according to claim 4 wherein the hollow mandrel comprises: a fluid inlet connection extending outwardly from the receiving vessel for introduction of a fluid, through the hollow mandrel, into the bore of the glass tubing being produced.

6. The method of producing a nondevitrified glass product of predetermined cross-sectional configuration and of indefinite length from an alkali-free alumino-silicate glass having the approximate composition by weight of $SiO_2$—61.5%, $Al_2O_3$—18.7%, CaO—% 11.4%, and MgO—8.2%, said glass having a liquidus temperature of approximately 1,235° C. and a viscosity, at the liquidus temperature, of 3.8 on the logarithmic scale, said method comprising the steps of: providing a glass-melting furnace having an outlet opening; providing a receiving vessel having an outlet orifice; causing molten glass of said composition to flow in a stream from the glass-melting furnace at a temperature above said liquidus temperature of the glass into the receiving vessel to maintain a body of glass in the receiving vessel; rapidly cooling the stream of glass as it flows to the receiving vessel to a temperature which is below said liquidus temperature; and withdrawing glass from the receiving vessel through the orifice at a forming temperature which is below said liquidus temperature to avoid devitrification and is sufficiently high to permit the glass to be formed 7. The method of claim 6 wherein the cross-sectional configuration of the product is annular, and further comprising introducing a fluid into the interior of said product as said product is withdrawn from the receiving vessel to maintain the pressure in said interior of the product sufficiently high to prevent the wall of said product from collapsing.

PO-1050
(5/69)

UNITED STATES PATENT OFFICE
CERTIFICATE OF CORRECTION

Patent No. 3,607,184      Dated September 21, 1971

Inventor(s) George F. Williams

It is certified that error appears in the above-identified patent and that said Letters Patent are hereby corrected as shown below:

Column 1, lines 69 and 70, change "$SiO_2$-61.5%";

to -- possess --;

Column 2, line 18, after "the" (first occurrence)

insert -- preference --;

Column 2, line 49, change "draw" to -- drawn --;

Column 2, line 68, change "nuts" to -- rotation --'

Column 3, line 31, change "practicing" to -- to --;

and Column 3, line 36, change "practicin" to

-- practicing --.

Signed and sealed this 14th day of March 1972.

(SEAL)
Attest:

EDWARD M. FLETCHER, JR.      ROBERT GOTTSCHALK
Attesting Officer      Commissioner of Patents